United States Patent [19]

Hirschfeld et al.

[11] Patent Number: 4,768,886

[45] Date of Patent: Sep. 6, 1988

[54] METHOD AND APPARATUS FOR SIMULTANEOUSLY MEASURING TEMPERATURE AND PRESSURE

[75] Inventors: Tomas B. Hirschfeld, Livermore; Gilbert R. Haugen, Pleasanton, both of Calif.

[73] Assignee: The Regents of the University of California, Berkeley, Calif.

[21] Appl. No.: 686,424

[22] Filed: Dec. 26, 1984

[51] Int. Cl.[4] ............................................. G01K 11/20
[52] U.S. Cl. ................................... 374/161; 374/127; 374/143; 73/714
[58] Field of Search ............... 374/121, 126, 127, 131, 374/143, 159, 161; 73/705, 714; 250/227

[56] References Cited

U.S. PATENT DOCUMENTS

| | | | |
|---|---|---|---|
| 4,075,493 | 2/1978 | Wickersheim | 374/159 |
| 4,200,110 | 4/1980 | Peterson et al. | 128/634 |
| 4,215,275 | 7/1980 | Wickersheim | 374/137 |
| 4,245,507 | 1/1981 | Samulski | 374/159 |
| 4,344,438 | 8/1982 | Schultz | 128/634 |
| 4,355,910 | 10/1982 | Quick et al. | 73/705 |
| 4,443,700 | 4/1984 | Macedo et al. | 73/705 |
| 4,447,546 | 5/1984 | Hirschfeld | 250/227 |
| 4,492,121 | 1/1985 | Lehto | 73/705 |
| 4,493,553 | 1/1985 | Korb et al. | 73/705 |
| 4,493,995 | 1/1985 | Adolfsson et al. | 250/227 |
| 4,509,370 | 4/1985 | Hirschfeld | 250/227 |
| 4,523,092 | 6/1985 | Nelson | 250/227 |
| 4,542,987 | 9/1985 | Hirschfeld | 374/161 |
| 4,581,530 | 4/1986 | Brogardh et al. | 73/705 |
| 4,592,664 | 6/1986 | Bijlenga et al. | 374/131 |
| 4,599,901 | 7/1986 | Hirschfeld | 250/227 |

FOREIGN PATENT DOCUMENTS

| | | | |
|---|---|---|---|
| 0180922 | 10/1983 | Japan | 374/159 |
| 2064107 | 6/1981 | United Kingdom | 374/131 |
| 0832367 | 5/1981 | U.S.S.R. | 73/705 |

OTHER PUBLICATIONS

Sholes R. R., "Fluorescent Delay Thermometer with Biological Applications", Rev. Sci Instr. 51(7), Jul. 1980, pp.—882–884.

Primary Examiner—Charles Frankfort
Assistant Examiner—Thomas B. Will
Attorney, Agent, or Firm—Stephen C. Macevicz; Henry P. Sartorio

[57] ABSTRACT

Method and apparatus are provided for simultaneously measuring temperature and pressure in a class of crystalline materials having anisotropic thermal coefficients and having a coefficient of linear compression along the crystalline c-axis substantially the same as those perpendicular thereto. Temperature is determined by monitoring the fluorescence half life of a probe of such crystalline material, e.g., ruby. Pressure is determined by monitoring at least one other fluorescent property of the probe that depends on pressure and/or temperature, e.g., absolute fluorescent intensity or frequency shifts of fluorescent emission lines.

20 Claims, 2 Drawing Sheets

METHOD AND APPARATUS FOR SIMULTANEOUSLY MEASURING TEMPERATURE AND PRESSURE

BACKGROUND OF THE INVENTION

The United States Government has rignts in this invention pursuant to Contract No. W-7405-ENG-48 between the U.S. Department of Energy and the University of California for the operation of Lawrence Livermore National Laboratory.

This invention relates generally to temperature and pressure sensing and, more particularly, to optical means for simultaneously measuring temperature and pressure in harsh or inaccessible environments.

Many processes in chemical technology, materials fabrication, and power generation technology depend critically on temperature and pressure. Difficulties in measuring these parameters are exacerbated when the processes involve highly corrosive conditions, or rapidly fluctuating temperatures and pressures, which, for example, occur in turbulent regimes or in shock waves. Industrial and military application of high explosivies often requires monitoring temperature and pressure changes associated with shock waves, such as those generated by materials exploding and interacting with constraining structures such as artillary projectile casings, bomb casings or molds for explosion-driven material fabrication. Currently, no practical means are available for simultaneously monitoring temperature and pressure in the extremely transient regimes created by high explosives, e.g., see Bassett, "The Diamond Cell and the Nature of the Earth's Mantle," *Annual Review of Earth Planetary Science*, Vol. 7, pg. 367 (1979).

Many events, such as underground explosions or earthquakes, produce large amplitude compressional stress waves or pressure pulses that almost instantaneously increase the value of stress or pressure in a material. Efforts to study such events by characterizing the pressure pulses are hampered by the lack of detectors with sufficiently high response times and with sufficient sensitivity to the non-hydrostatic nature of the pressure changes.

In other harsh environments where sensors response time may not be as critical, such as the interiors of nuclear reactor pressure vessels, boilers, petroleum cracking vessels, and the like, a major problem exists in providing temperature and pressure sensors whose accuracy is not degraded by the corrosiveness of the material whose temperature and pressure are being monitored. Moreover, in such environments temperature and pressure are currently measured separately which frequently necessitates additional equipment and more than one access port into the hazardous region.

The use of ruby to measure high pressures has been known for many years. For example, see Forman, et al., "Pressure Measurement Made by the Utilization of Ruby Sharp-Line Luminescence," *Science*, Vol. 176, pgs. 284–285 (21 Apr. 1972), and Barnett, et al., "An Optical Fluorescence System for Quantitative Pressure Measurement in the Diamond-Anvil Cell," *Review of Scientific Instruments*, Vol. 44, pgs. 1–9 (Jan. 1973). These publications disclose the use of pressure-dependent shifts of the $R_1$ and $R_2$ fluorescent emission lines in ruby for determining pressure. The temperature-dependence of tne ruby fluorescent spectrum has also been known for many years, e.g., Lenguyel, *Lasers*, 2nd Ed., Chap. 4 (John wiley & Sons, New York, 1971); however, this property has only recently been exploited for measurement purposes. In other materials, temperatures-dependent fluorescent spectra has also been exploited for measuring temperature. For example, Wickersheim in U.S. Pat. No. 4,075,493, issued 21 Feb. 1978, describes the use of doped oxysulfides of rare earths for measuring temperature by monitoring fluorescent emission line intensity ratios in these materials. Also, Samulski in U.S. Pat. No. 4,245,507, issued 20 Jan. 1981, suggests the use of any of three fluorescent properties, emission line intensity, emission line frequency shifts and fluorescent lifetime, for measuring temperature.

The foregoing illustrates the limitations of current temperature and pressure sensing technology. An alternative to available pressure and temperature sensing methods which overcomes some of these limitations would be highly advantageous for remote and simultaneous pressure and temperature sensing applications.

SUMMARY OF THE INVENTION

It is therefore an object of the invention to provide a method and apparatus using the fluorescent properties of crystalline materials to simultaneously measure temperature and pressure, especially in harsh or inaccessible environments.

Another object of the invention is to provide means for monitoring temperature and pressure simultaneously and remotely by way of a fiber optic.

A further object of the invention is to provide a method and apparatus for causing ruby to emit optical signals from which temperature and pressure adjacent to the ruby can be determined substantially simultaneously.

These and other objects are attained in accordance with present invention wherein (1) a crystalline material, such as ruby, is placed in contact with a region whose temperature and pressure are to be monitored simultaneously, (2) the crystalline material is caused to fluoresce in such a manner that its fluorescence lifetime can be measured, and (3) at least one other fluorescent property is measured which depends either on pressure or on both temperature and pressure. The invention applies the discovery that fluorescence lifetime in certain crystalline materials, particularly ruby, is substantially independent of pressure. Other kinds of fluorescent phenomena depend on both pressure and temperature, e.g., shifts of emission lines and absolute intensity. The thermal effects on signals derived from this latter class phenomena can be factored out by signal processing means provided a means is available for measuring temperature simultaneously and independently. Fluorescence half life can provide the necessary independent and substantially simultaneous measure of temperature, so that pressure information can be extracted from fluorescent signals depending on both the temperature and pressure.

The present invention is directed to the problem of simultaneously and remotely monitoring temperature and pressure, particulary in harsh or inaccessible environments. It advantageously overcomes the problem of simultaneous measurement by application of fluorescent half life data to the analysis of other fluorescent properties which are measured substantially at the same time and whose characteristics depend on both temperature and pressure. The problem of remote measurement is overcome by the application of rugged, high quality fiber optics to transmit light for exciting fluorescence and for collecting the resultant emissions for analysis. The problem of monitoring temperature and pressure in harsh environments is overcome by the inherent strength, corrosion resistance, and heat-resistance of fiber optics and the crystalline materials amenable for use with the invention, particularly ruby. Finally, the embodiments of the invention employing fiber optics are amenable for use with a multiposition sensing system which comprises many sensors, all of which feed signals into a single station for analysis. Such a configuration can reduce costs by obviating the need for separate analyzers for each sensor, and can increase reproducibility between sensors by having all signals analyzed by the same instrument.

BRIEF DESCRIPTION OF THE DRAWINGS

Further objects of the invention, together with additional features contributing thereto and advantages accruing therefrom will be apparent from the following description of the preferred embodiment of the invention which is shown in the accompanying drawings, which are incorporated in and form a part of the specification.

In the drawings.

DETAILED DESCRIPTION OF THE INVENTION

Reference will now be made in detail to the present embodiment of the invention, examples of which are illustrated in the accompanying drawings.

Figure 1:
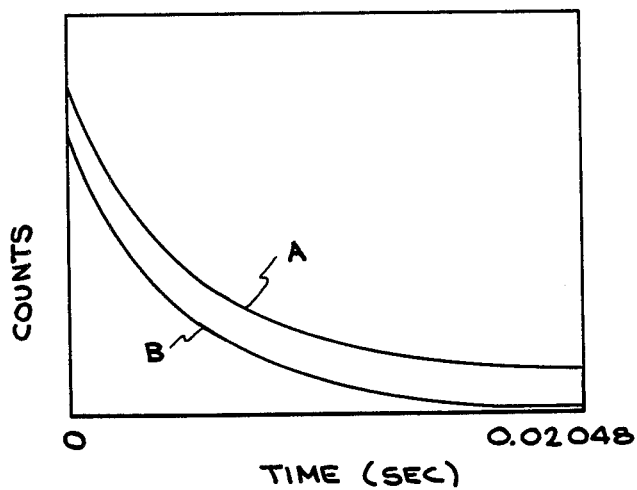
FIG. 1 illustrates the pressure independence of fluorescence decay time of the 694.3 nanometer emission line of ruby. Curve A is fluorescent intensity versus time at 15,000 bar and curve B is fluorescent intensity versus time at 1 bar. Curve A has been shifted to the right by a 0.5 msec delay.

In accordance with the present invention a method and apparatus are provided for simultaneously measuring temperature and pressure. The invention is an application of the fluorescence properties of a class of crystalline solids, particularly ruby. As indicated by FIG. 1 the fluorescence decay time of ruby is substantially independent of variations in pressure. The standard measure of fluorscence decay time is fluorescence half life time, which is the time it takes fluorescent emissions to decay to half their initial intensity. For example, in FIG. 1 curve A indicates a half life of 2.29 msec. at 15 Kbar of pressure and curve B indicates a half life of 2.13 msec. at 1 bar of pressure (these values being within a standard deviation (±5.5%) of one another). Thus, in ruby, fluorescence decay time is substantially independent of pressure over a range encompassing more than four orders of magnitude of pressure difference.

It is believed that the advantageous results of the invention are obtained because the coefficients of linear compression are the same along the crystalline c-axis and directions perpendicular thereto and the thermal coefficients are markedly anisotropic in the class of materials suitable for use in accordance with the invention. It is believed that the above properties cause the fluorescence half life to be substantially independent of pressure.

In accordance with the invention temperature is determined by a signal processing means which includes a microprocessor for looking up temperature on a table stored in memory which relates fluorescence half life to temperature for the particular crystalline material used. Hereinafter this table is referred to as a first stored table. Once the temperature is known, the signal processing means can evaluate another fluorescence property which depends on both temperature and pressure. Such properties include fluorescence intensity and shifts in fluorescent emission line frequency. In the memory of the microprocessor there are tables which relate values of such a property to pressure for each of a plurality of temperatures. For convenience, these tables are referred to as second stored tables. Thus, once the temperature is determined the proper second stored table relating values of the temperature and pressure dependent fluorescent property to pressure can be selected by the microprocessor, and pressure can be looked up. Such tables can be constructed which relate pressure to emission line shifts for particular temperatures, and pressure to fluorescence intensity for particular temperatures.

Many optical configurations can be used in accordance with the invention for illuminating the crystalline material and for measuring fluorescence half life and fluorescence intensity or emission line shifts. Design of particular optical configurations is well known in the art, e.g., Driscoll, Editor, *Handbook of Optics* (McGraw-Hill Book Company, New York, 1978), *Optical Industry and Systems Purchasing Directory*, 26th Ed. (Optical Publishing Company, Pittsfield, Mass., 1980), and the like.

Figure 2:
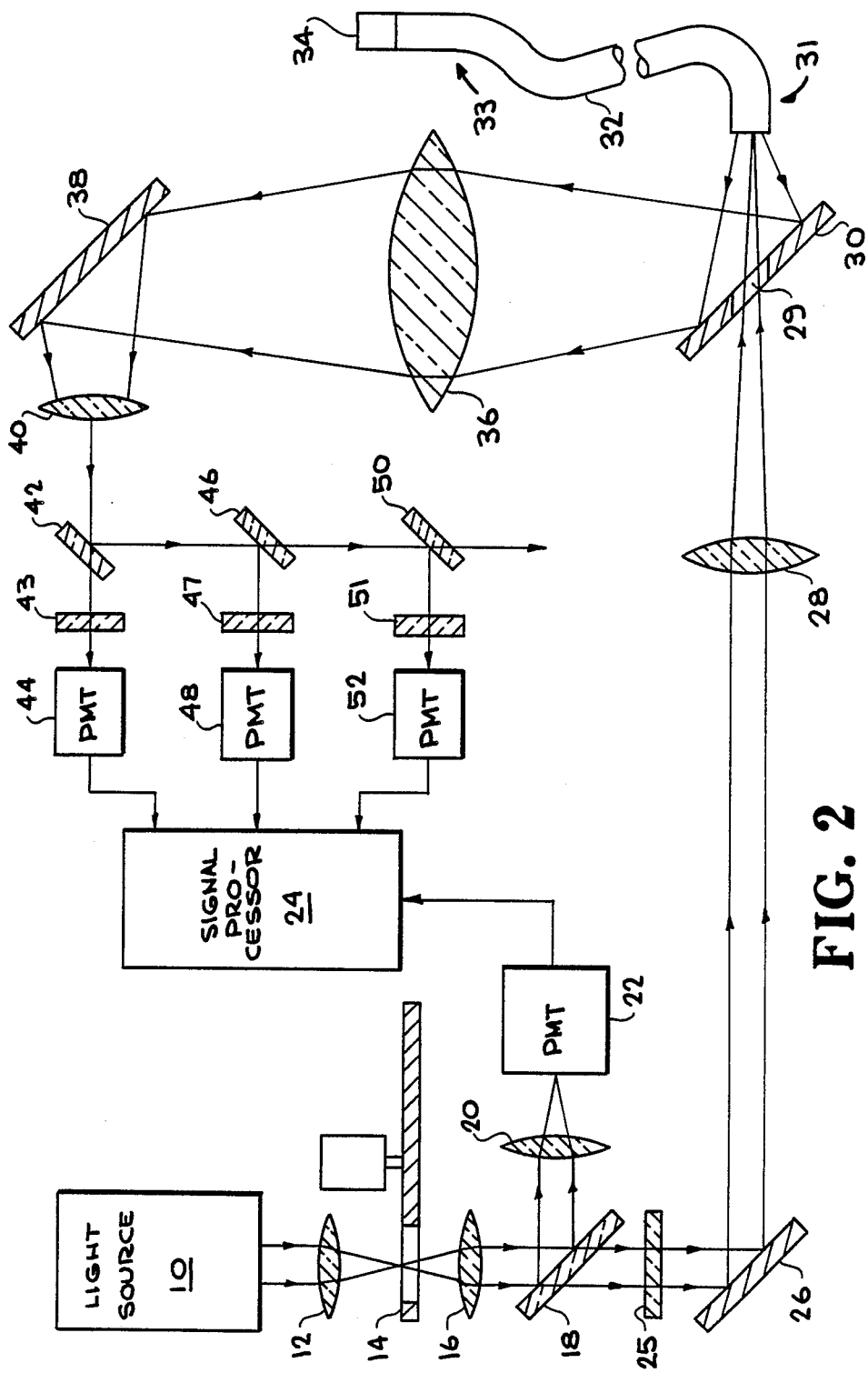
FIG. 2 diagrammatically shows one embodiment of an optical configuration employing a fiber optic for simultaneously measuring fluorescence half life and shifts in emission line frequency.

FIG. 2 diagrammatically illustrates one embodiment of an optical configuration for measuring approximately simultaneously fluorescence half life and fluorescence emission line shifts in a ruby crystal.

An illumination beam is generated by light source 10, which is preferably a laser operating at a wavelength suitable for generating a fluorescence response from crystalline material 34. Most perferably, the light source is a mode-locked laser generating pulses in the nanosecond range, or less. Pulsed output from light source 10 is preferred over continuous output because very high peak power can be achieved with relatively low average power. Illumination beams with high average power could cause heat damage to components of the system, e.g., fiber optic 32. When the crystalline material is ruby, an argon ion-laser operating at 514.5 nanometers, mode-locked, generating 150–200 picosecond pulses, is preferred. The illumination beam generated by light source 10 is focused by lens 12. At the focal point of lens 12 mechanical chopper 14 periodically interrupts the illumination beam for periods on the order of several milliseconds. Interruption of the illumination beam by chopper 14 is necessary for measuring the rate of fluorescence decay of crystalline material 34. Typical decay times are on the order of milliseconds. Lens 16 re-collimates the illumination beam, which then passes through beam splitter 18. Part of the illumination beam passes through collection lens 20 and is directed to photomultiplier tube 22 (e.g., an RCA IP28 or the like). Output from photomultiplier tube 22 triggers detection circuits in signal processor 24 for measuring fluorescent decay whenever the illumination beam is temporarily interrupted by mechanical chopper 14. The rest of the illumination beam passes through beam splitter 18 and polarizer 25, is reflected by mirror 26, and is focused by lens 28 for injection into the first end 31 of fiber optic 32.

Polarizer 25 circularly polarizes the light from light source 10. Typically, the fluorescent response of crystalline material 34 depends on the orientation of its crystalline axes relative to the plane of polarization of the illumination beam. An illumination beam comprising circularly polarized light ensures that the electric vector of each wave periodically points in every direction in the plane perpendicular to the direction of propagation, thereby obviating the need to place crystalline material 34 in any special orientation at second end 33 of fiber optic 32.

Lens 28 has a relatively long focal length so that light from the illumination beam enters the first end 31 of fiber optic 32 within the acceptance angle of the fiber, and so that aperture 29 in apertured mirror 30 can be as small as possible. Light transmitted by fiber optic 32 illuminates crystalline material 34 causing it to fluoresce. The same fiber optic 32 collects a portion of the fluorescent emissions and transmits them from its second end 33 to its first end 31. The transmitted fluorescent emissions or fluorescent signals exit first end 31 of fiber optic 32 in a beam whose divergence depends on the accpetance angle of fiber optic 32. Preferably fiber optic 32 is a high quality communications type fiber, such as a Valtec PC-10 (Valtec Optical Group, waltam, Mass.), or the like. The fluorescent signals emanating from first end 31 of fiber optic 32 are reflected by apertured mirror 30 to collection lens 36. Lens 36 focuses the fluorescent signal into collimating lens 40 via mirror 38. The collimated beam comprising the fluorescent signal then passes through a series of beam splitters 42, 46 and 50, and interference filters 43, 47 and 51. The purpose of the arrangement of interference filters and beam splitters in this particular embodiment is to measure frequency shifts in the $R_1$ emission line of ruby and to measure total fluorescence intensity of both the $R_1$ and $R_2$ emission lines of ruby. Frequency shifts of the $R_1$ line are measured by providing two narrow-band interference filters (43 and 47 in FIG. 2) whose wavelengths of maximum transmission overlap tne $R_1$ emission line distribution on opposite sides of its maximum. As the $R_1$ emission line distribution shifts in frequency the relative intensity of the light transmitted by the two narrow band interference filters provides a measure of the extent of the shift. The extent of the shift, in turn, can be related to pressure, provided the temperature is known. Temperature is determined by measuring the fluorescent half life of the $R_1$ and $R_2$ emission lines. This is accomplished in the illustrated embodiment by providing interference filter 51 which has a broad enough bandwidth to allow transmission of light from both the $R_1$ and $R_2$ distributions, regardless of their shifting due to contemplated temperature and pressure changes. Preferably, signal processor 24 computes shifts of frequency on the basis of changes in the intensity ratio of the signals detected by the narrow band interference filters. This improves accuracy by making the results of the computation independent of illumination beam intensity, which may fluctuate substantially.

As the fluorescent signal leaves collimating lens 40, it is split into two beams one of which is directed to beam splitter 46, the other of which is directed to interference filter 43. Interference filter 43 has, for example, a transmission maximum over the band from about 694.3 to about 694.9 nanometers (filters with such characteristics being available from Omega Optical, Brattleboro, Vt.). Beam splitter 46 splits light from beam splitter 42 into two beams one of which is directed to beam splitter 50, the other of which is directed to interference filter 47. Interference filter 47 has, for example, a transmission maximum over the band from about 693.7 to about 694.3 nanometers (filters of such characteristics being available from Omega Optical, Brattleboro, Vt.). Beam splitter 50 reflects most of the remaining signal to interference filter 51 which, for example, passes light in the wavelength band from about 689.6 to about 697.6 nanometers (filters of such characteristics being available from Omega Optical, Brattleboro, Vt.). Light transmitted by interference filters 43, 47 and 51 is directed to photomultiplier tubes 44, 48 and 52, respectively. Output signals from photomultiplier tubes are transmitted to signal processor 24. As mentioned above, measurement of total fluorescence is triggered by a signal from photomultiplier tube 22. whenever the signal from photomultiplier tube 22 indicates that the illumination beam is blocked by mechanical chopper 14, the measurement circuit in signal processor 24 is activated to record the output signal from photomultiplier tube 52. Signal processor 24 then computes fluorescence half life from the recorded signal. *RCA Photomultiplier Manual* (RCA Corporation Technical Series PT-61, 1970), and chapters 4 and 8, respectively entitled, "Nonimaging Detectors," and "Coatings and Filters," of *Handbook of Optics* (McGraw-Hill Book Company, New York, 1978) are guides to choosing appropriate filters and photomultiplier tubes for the embodiment illustrated in FIG. 2, and other embodiments. Accordingly, these references are incorporated by reference.

Figure 3:
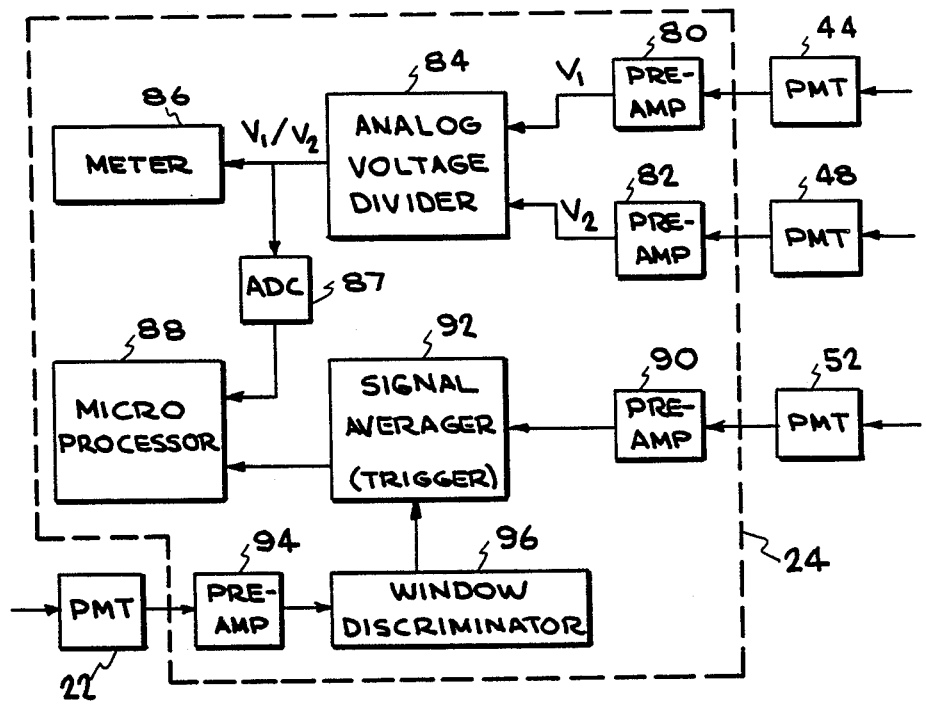
FIG. 3 diagrammatically shows one embodiment of a signal processing means suitable for use with the optical configuration of FIG. 2.

FIG. 3 illustrates one embodiment of signal processing means 24 suitable for use with the preferred optical arrangement of FIG. 2. Photomultipler tubes 44 and 48 collect fluorescent light from narrow frequency bands on opposite sides of the maximum of the $R_1$ emission line distribution of ruby. The outputs of photomultiplier tubes 44 and 48 are amplified by preamplifiers 80 and 82, respectively. The voltage outputs of preamplifiers 80 and 82, $V_1$ and $V_2$, respectively, are received by analog voltage divider 84. Output of analog voltage divider 84 is a voltage having a value of $V_1/V_2$, which is proportional to the ratio of fluorescence intensities of the narrow frequency bands defined by filters 43 and 47 of FIG. 2. Output of analog voltage divider 84 can be measured directly by meter 86. The output is also digitized by analog-to-digital converter 87 and transmitted to microprocessor 88. Photomultiplier tube 52 collects fluorescent emissions over a frequency band (defined by filter 51) encompassing the $R_1$ and $R_2$ emission line distributions of ruby crystal 34. The output of photomultiplier tube 52 is amplified by preamplifier 90. The voltage output of preamplifier 90 is received by signal averager 92 (for example, a Tracor Northern, Inc., Middleton, Wis., model 1710-30 multichannel analyzer, or the like). Signal averaging is synchronized with the operation of mechanical chopper 14 (of FIG. 2) by triggering pulses derived from the output of photomultiplier tube 22. The output of photomultiplier tube 22 is preamplified by preamplifier 94 and received by window discriminator 96 (for example, an Ortec Inc., Oak Ridge, Tenn., model 550, or the like). Window discriminator 96 generates a triggering signal whenever it detects a leading edge of a pulse generated by photomultiplier tube 22. The triggering pulse is received by signal averager 92. Signal averager 92 collects and averages a predetermined number of signals to form fluorescent intensity and fluorescence lifetime data. These data are then transferred to microprocessor 88 where, together with data from analog voltage divider 84, temperature and pressure are computed.

The accuracy of measuring shifts in fluorescent emission line frequency can be enhanced by providing additional narrow band interference filters. Again, ratios of intensities of light transmitted by the filters are the preferred quantities for use in computing frequency shifts by signal processor 24. In the embodiment illustrated in FIG. 3 emission line shifts are determined simply by looking up the intensity ratio (as measured by the output of analog voltage divider 84) on a table which relates intensity ratio to the extent of emission line shifts.

More elaborate and more accurate means for determining frequency shifts are possible and in some cases may be preferred. For example, the $R_1$ and $R_2$ emission line distributions can be "fit" by a sum of Gaussian curves whose means correspond to the maximums of the $R_1$ and $R_2$ emission lines. The standard deviations of the Gaussian curves (which determine how broad they are) are empirically predetermined functions of temperature. This approach improves the accuracy by which the extent of shifting is determined because it takes into account changes in intensity ratios caused by emission line broading as well as by emission line shifting. Yet another technique for monitoring $R_1$ and $R_2$ frequency shifts entails measuring the entire ruby emission spectrum simultaneously by using a TV camera optical multichannel analyzer, or the like.

In accordance with the invention, total fluorescence intensity is another property which can be used to discern pressure once temperature is known. Preferably when total fluorescence intensity is employed in an embodiment utilizing a fiber optic, Raman backscatter from the fiber optic is monitored. In this embodiment a signal processing means relates the total fluorescence-Raman backscatter intensity ratio to pressure for a predetermined plurality of temperatures. This approach reduces error due to fluctuations in illumination beam intensity. Techniques for measuring Raman backscatter are well-known in the art of Raman spectroscopy, e.g., chapter 2, entitled "Experimental Methods," in Tobin, *Laser Raman Spectroscopy* (Wiley Interscience, New York, 1971) describes suitable apparatus. Accordingly, this chapter is incorporated by reference.

Although ruby is the preferred crystalline material for use in accordance witn the invention, other crystalline materials can be used and may be preferred under certain conditions. Other crystalline materials suitable for use with the invention include chromium doped yttrium aluminum ($YAlO_3$) and yttrium aluminum garnet (YAG), and neodymium doped yttrium aluminum, as well as other crystalline solids used as laser materials, i.e., laser crystals.

For all of the above-described embodiments fluorescence half life of the crystalline material employed sets the limit on the response time of the detector to changes in pressure and temperatures. Response times of detectors using ruby can be enhanced by doping the ruby with a quenching ion, such as $Fe^{+3}$. A ruby doped with ferric ions is formed by exposing a sapphire fiber to $Cr_2O_3$ and $Fe_2O_3$. One effect of the iron is to reduce fluorescent lifetime thereby increasing sensitivity to rapid fluctuations in ambient temperature. Response times of 10-100 sec are obtained over several hundred meters of fiber optic (Valtec PC-10) for a 633 nm illumination beam. Such results are obtained with a 250 m sapphire fiber which is doped by exposure to an 80% $Al_2O_3$, 10% $Cr_2O_3$, 10% $Fe_2O_3$ mixture at 1500° C. for 2 hours. Generally, the preferred dopant concentration ranges are 0.5-5% for Cr, and 0.01-5% for Fe. Preferred particular concentrations of ferric ions depend on the desired response range. Sapphire doped within these ranges is referred to as ruby counter-doped with ferric ions. As iron concentration is increased, the ability to monitor fluorescent emissions over very long fiber optics is correspondingly reduced, as the quenching effects of the ferric ions reduces fluorescence intensity as well as fluorescence lifetime.

The descriptions of the foregoing embodiments of the invention have been presented for purposes of illustration and description. They are not intended to be exhaustive or to limit the invention to the precise form disclosed, and obviously many modifications and variations are possible in light of the above teaching. The embodiments were chosen and described in order to best explaining the principles of the invention and its practical application to thereby others skilled in the art to best utilize the invention in various embodiments and with various modifications as are suited to the particular uses contemplated. It is intended that the scope of the invention be defined by the claims appended hereto.

We claim:

1. A method of simultaneously monitoring temperature and pressure comprising:
    positioning in a region whose temperature and pressure are to be simultaneously monitored a crystalline material, the crystalline material having a crystalline c-axis, thermal coefficients, and coefficients of linear compression, the thermal coefficients being anisotropic, and the coefficient of linear compression along the crystalline c-axis being substantially the same as the coefficients of linear compression perpendicular thereto;
    intermittantly illuminating the crystalline material with an illumination beam so that a fluorescent signal is generated from which fluorescence half life which is independent of pressure and at least one other fluorescent property depending on pressure can be measured substantially at the same time;
    detecting the fluorescent signal; and
    determining temperature and pressure from the fluorescent signal by measuring the fluorescence half life and the pressure dependent fluorescent property and first determining the temperature by comparing the measured fluorescence half life to a known pressure independent relationship between fluorescent half life and temperature and then determining the pressure by comparing the measured pressure dependent fluorescent property to a known relationship between pressure and the pressure dependent fluorescent property at the previously determined temperature.

2. The method of claim 1 wherein said at least one other fluorescent property is selected from fluorescence intensity of at least one fluorescent emission line of said crystalline material and extent of frequency shifting of at least one fluorescent emission line of said crystalline material.

3. The method of claim 2 wherein said crystalline material is a laser crystal.

4. The method of claim 3 wherein said step of intermittantly illuminating includes providing a fiber optic through which light from said illumination beam is transmitted from a first end of the fiber optic to a second end of the fiber optic, the second end of the fiber optic being adjacent to said laser crystal so that light from said illumination beam emanating from the second end of the fiber optic intermittantly illuminates said laser crystal causing it to generate fluorescent emissions, and so that a portion of the generated fluorescent emissions is collected by the second end of the fiber optic and transmitted to the first end of the fiber optic, the transmitted portion of the generated fluorescent emissions forming said fluorescent signal; and wherein said step of detecting includes providing means adjacent to the first end of the fiber optic for separating said illumination beam from said fluorescent signal.

5. The method of claim 4 wherein said laser crystal is a ruby, the ruby having an $R_1$ emission line distribution, and wherein said step of detecting includes monitoring shifts in the $R_1$ emission line distribution of the ruby.

6. The method of claim 5 wherein said step of determining temperature and pressure includes:
measuring fluorescence half life from said fluorescent signal;
measuring the extent of frequency shifting of said $R_1$ emission line distribution of said ruby from said fluorescent signal;
comparing the measured value of fluorescence half life with half life values on a first stored table whicn relates ruby fluorescence half life to temperature so that ruby temperature is determined;
selecting a second stored table which corresponds to the determined ruby temperature and which relates extent of frequency shifting of said $R_1$ emission line distribution to pressure; and
comparing the measured extent of frequency shifting with extent-of-shift values on the second stored table so that ruby pressure is determined.

7. The method of claim 4 wherein said step of detecting includes: collecting Raman emissions of said fiber optic, the Raman emissions being caused by the transmission of said illumination beam through said fiber optic; and monitoring the intensity of the collected Raman emissions.

8. The method of claim 7 wherein said step of determining temperature and pressure includes: forming a ratio of the intensity of said collected Raman emissions to the intensity of said fluorescent signal; and relating the ratio to the pressure adjacent to said laser crystal.

9. An apparatus for simultaneously monitoring temperature and pressure comprising:
a laser crystal having a crystalline c-axis, thermal coefficients, and coefficients of linear compression, the thermal coefficients being anisotropic, and the coefficient of linear compression along the crystalline c-axis being substantially the same as the coefficients of linear compression perpendicular thereto;
a fiber optic through which an illumination beam from at least one associated light source is transmitted from a first end of the fiber optic to a second end of the fiber optic, the second end of the fiber optic being adjacent to the laser crystal so that light from the illumination beam emanating from the second end of the fiber optic illuminates the laser crystal causing it to generate fluorescent emissions, and so that a portion of the generated fluorescent emissions is collected by the second end of the fiber optic and transmitted to the first end of the fiber optic, the transmitted portion of the generated fluorescent emissions forming a fluorescent signal;
means associated with the first end of the fiber optic for intermittantly interrupting the illumination beam so that the laser crystal is intermittantly illuminated;
means associated with the first end of the fiber optic for detecting the fluorescent signal; and
signal processing means associated with the detection means for determining, from the fluorescent signal, the fluorescence half life of the laser crystal which is independent of pressure and a value of at least one other fluorescent property of the laser crystal which depends on pressure and for first determining the temperature by comparing the measured fluorescence half life to a known pressure independent relationship between fluorescence half life and temperature and then determining the pressure by comparing the measured pressure dependent fluorescent property to a known relationship between pressure and the pressure dependent fluorescent property at the previously determined temperature.

10. The apparatus of claim 9 wherein said at least one other fluorescent property is fluorescence intensity of at least one fluorescent emission line of said laser cyrstal.

11. The apparatus of claim 10 wherein said detection means includes means for monitoring the intensity of Raman emissions caused by the transmission of said illumination beam through said fiber optic.

12. The apparatus of claim 11 wherein said signal processing means includes means for forming a ratio of said intensity of Raman emissions to said fluorescence intensity of said at least one fluorescent emission line, and means for relating the ratio to the pressure adjacent to said laser crystal.

13. The apparatus of claim 9 wherein said at least one other fluorescent property is the extent of frequency shifting of at least one fluorescent emission line of said laser crystal.

14. An apparatus for simultaneously monitoring temperature and pressure comprising:
a ruby having an $R_1$ fluorescent emission line and an $R_2$ fluorescent emission line;
a fiber optic through which an illumination beam from at least one associated light source is transmitted from a first end of the fiber optic to a second end of the fiber optic, the second end of the fiber optic being adjacent to the ruby so that light from the illumination beam emanating from the second end of the fiber optic illuminates the ruby causing it to generate fluorescent emissions, and so that a portion of the generated fluorescent emissions is collected by the second end of the fiber optic and transmitted to the first end of the fiber optic, the transmitted portion of the generated fluorescent emissions forming a fluorescent signal;
means associated with the first end of the fiber optic for intermittantly interrupting the illumination beam so that the ruby is intermittantly illuminated;
means associated with the first end of the fiber optic for detecting the fluorescent signal; and
signal processing means associated with the detection means for determining from the fluorescent signal the fluorescence half life of the ruby which is independent of pressure and a value of at least one other fluorescent property of the ruby which depends on pressure and for first determining the temperature by comparing the measured fluorescence half life to a known pressure independent relationship between fluorescence half life and then determining the pressure by comparing the measured pressure dependent fluorescent property to a known relationship between pressure and the pressure dependent fluorescent property at the previously determined temperature.

15. The apparatus of claim 14 wherein said at least one other fluorescent property is fluorescence intensity of at least one fluorescent emission line of said ruby.

16. The apparatus of claim 15 wherein said detection means includes means for monitoring the intensity of the Raman emissions caused by the transmission of said illumination beam through said fiber optic, and wherein said signal processing means includes means for forming a ratio of the intensity of the Raman emissions to said fluorescence intensity of said at least one fluorescent emission line and means for relating the ratio to the pressure adjacent to the ruby for each of a plurality of predetermined temperatures.

17. The apparatus of claim 14 wherein said at least one other fluorescent property is the extent of frequency shifting of at least one fluorescent emission line of said ruby.

18. The apparatus of claim 17 wherein said at least one fluorescent emission line is said $R_1$ fluorescent emission line of said ruby.

19. The apparatus of claim 18 wherein said ruby is counter-doped with ferric ions.

20. The apparatus of claim 19 wherein the ruby is counter-doped with ferric ions in a concentration range of about 0.01 to 5 percent.

* * * * *